United States Patent
Dousse et al.

(10) Patent No.: US 11,074,812 B2
(45) Date of Patent: Jul. 27, 2021

(54) METHOD, APPARATUS, AND COMPUTER PROGRAM PRODUCT FOR REDUCING REDUNDANT DATA UPLOADS

(71) Applicant: HERE GLOBAL B.V., Eindhoven (NL)

(72) Inventors: Olivier Dousse, Berlin (DE); Akos Nagy, Kaatsheuvel (NL)

(73) Assignee: HERE GLOBAL B.V., Eindhoven (NL)

(*) Notice: Subject to any disclaimer, the term of this patent is extended or adjusted under 35 U.S.C. 154(b) by 242 days.

(21) Appl. No.: 16/203,910

(22) Filed: Nov. 29, 2018

(65) Prior Publication Data

US 2020/0175854 A1 Jun. 4, 2020

(51) Int. Cl.
| | |
|---|---|
| G08G 1/01 | (2006.01) |
| H04W 4/40 | (2018.01) |
| H04W 72/04 | (2009.01) |

(52) U.S. Cl.
CPC ......... *G08G 1/0129* (2013.01); *G08G 1/0133* (2013.01); *G08G 1/0141* (2013.01); *H04W 4/40* (2018.02); *H04W 72/0413* (2013.01)

(58) Field of Classification Search
None
See application file for complete search history.

(56) References Cited

U.S. PATENT DOCUMENTS

| | | | |
|---|---|---|---|
| 10,096,241 B2 | 10/2018 | Nakamura | |
| 2011/0159800 A1* | 6/2011 | Ueoka | G06F 16/283 455/3.06 |
| 2012/0065871 A1 | 3/2012 | Deshpande et al. | |
| 2016/0003972 A1 | 1/2016 | Angermann et al. | |
| 2017/0277716 A1* | 9/2017 | Giurgiu | G06F 16/2365 |

(Continued)

FOREIGN PATENT DOCUMENTS

| | | |
|---|---|---|
| EP | 3 130 891 B1 | 2/2017 |
| EP | 3 196 858 A1 | 7/2017 |
| EP | 3 222 973 A2 | 9/2017 |

(Continued)

OTHER PUBLICATIONS

Partial European Search Report for Application No. 19211762.0 dated Apr. 22, 2020, 15 pages.

(Continued)

*Primary Examiner* — Abdhesh K Jha
(74) *Attorney, Agent, or Firm* — Alston & Bird LLP (57) ABSTRACT

A method, apparatus, and computer program product are provided to reduce redundant data uploads, the method includes, for example, providing a collection indicator for a specific data type on a given road. The method further includes separating a plurality of data points for the specific data type collected during travel of a vehicle along the given road into a transmission group of data points and a non-transmission group of data points. The separating of the plurality of data points may be done by determining an amount of data points to be included in the transmission group by applying the collection indicator to the plurality of data points for the specific data type that are collected during travel of the vehicle along the given road. The method still further includes causing the transmission of the transmission group of data points.

20 Claims, 4 Drawing Sheets

(56) References Cited

U.S. PATENT DOCUMENTS

2018/0188037 A1 7/2018 Wheeler et al.
2019/0306050 A1* 10/2019 Onishi ............... G06F 16/2255

FOREIGN PATENT DOCUMENTS

| WO | WO 2016/130719 A2 | 8/2016 |
| WO | WO 2017/037784 A1 | 3/2017 |
| WO | WO 2017/190503 A1 | 11/2017 |

OTHER PUBLICATIONS

Yang, J. et al., *Vehicle Networking Data—Upload Strategy Based on Mobile Cloud Services*, EURASIP Journal on Embedded Systems 2016:22 (2016) 8 pages.
Extended European Search Report for Application No. 19211762.0 dated Sep. 17, 2020, 15 pages.

* cited by examiner

METHOD, APPARATUS, AND COMPUTER PROGRAM PRODUCT FOR REDUCING REDUNDANT DATA UPLOADS

TECHNOLOGICAL FIELD

Example embodiments of the present disclosure relate generally to a method and associated apparatus and computer program product, and more particularly, to a method and associated apparatus and computer program product for reducing redundant data uploads.

BACKGROUND

While a vehicle is driven along various roads of a road network, probe points are frequently captured by various devices including global positioning systems ("GPS"), navigation systems or the like. Each probe point is associated with a location, such as may be expressed in terms of latitude and longitude. Some probe points are also associated with a heading and a speed at which the vehicle was moving at the time at which the probe point was captured. Data collected by individual devices are often then transmitted to data aggregators, such as map service providers, navigation service providers or the like, who use the data to create information relating to the roads in question. However, the amount of vehicles on a given road can vary drastically and often can result in either too much or too little data being collected about the road. Techniques for collecting probe data predominately use either always-on collection methods (e.g., traffic probes) or campaign definitions (e.g., coarse geographic or time based restrictions). Always-on collection methods result in redundant data for busy streets. Campaign definitions can reduce the amount data collected on busy roads, but the coarse nature of the campaign definitions also results in reducing the amount of data collected on less busy roads that do not have a surplus of probe points. Collecting redundant data puts a strain on network connectivity and consumes additional processing and communication resources, thereby potentially using bandwidth needed for the transmission of other non-redundant data points.

BRIEF SUMMARY

A method, apparatus, and computer program product are provided for reducing redundant data uploads. In an example embodiment, a method, apparatus, and computer program product are provided for use in vehicles that collect data during use. In this regard, the method, apparatus, and computer program product allow for a reduction in the number of data points transmitted by vehicles on busy roads without impairing the reliability of predictions made based upon the data. For each type of data, there may be a number of data points that if collected over a given road segment allows for reliable predictions regarding the road segment. Therefore, after the number of data points has been collected and processed, the number of data points that are uploaded and then processed can be reduced without meaningfully reducing the reliability of the predictions, therefore allowing computing and network resources to be conserved and/or to be made available for other uses, such as the analysis of data points collected by vehicles driving along less traveled road segments. Consequently, the method, apparatus, and computer program product of an example embodiment allow for a reduction in the number of data points uploaded and processed from vehicles driving along heavy travelled roads without negatively affecting data collection along lesser travelled roads, including lesser travelled roads located near to heavily travelled roads.

In an example embodiment, a method is provided for reducing redundant data uploads. The method includes providing a collection indicator for a specific data type on a given road. The collection indicator provides an indication of an amount of data points to be transmitted for the specific data type on the given road with the amount of data points to be transmitted being less than an amount of data points for the specific data type that are collected on the given road. The method also includes separating a plurality of data points for the specific data type collected during travel of a vehicle along the given road into a transmission group of data points and a non-transmission group of data points. Separating the plurality of data points includes determining an amount of data points to be included in the transmission group by applying the collection indicator to the plurality of data points for the specific data type that are collected during travel of the vehicle along the given road. The method further includes causing the transmission of the transmission group of data points.

In an example embodiment, the method also includes altering the collection indicator based on a desired confidence interval associated with the transmission group of data points. In another embodiment, the method also includes determining a cumulative amount of data points collected by a plurality of vehicles traveling along the given road using a traffic volume of the given road over time. In still another embodiment, the method also includes repeatedly updating the collection indicator.

In an example embodiment, providing the collection indicator includes providing different collection indicators on the given road for different types of data being collected. In another embodiment, the method includes all data points collected during the travel of the vehicle in the transmission group of data points. In still another embodiment, the method also includes storing, with a memory device, at least one of the transmission group of data points or the non-transmission group of data points.

In another embodiment, an apparatus is provided that includes at least one processor and at least one memory including computer program code instructions with the computer program code instructions configured to cause the apparatus to reduce redundant data uploads. The computer program instructions are configured to, when executed, cause the apparatus to provide a collection indicator for a specific data type on a given road. The collection indicator provides an indication of an amount of data points to be transmitted for the specific data type on the given road with the amount of data points to be transmitted being less than an amount of data points for the specific data type that are collected on the given road. The computer program instructions are also configured to, when executed, cause the apparatus to separate a plurality of data points for the specific data type collected during travel of a vehicle along the given road into a transmission group of data points and a non-transmission group of data points. Separating the plurality of data points includes determining an amount of data points to be included in the transmission group by applying the collection indicator to the plurality of data points for the specific data type that are collected during travel of the vehicle along the given road. The computer program instructions are further configured to, when executed, cause the apparatus to cause the transmission of the transmission group of data points.

In an example embodiment, the computer program instructions are also configured to, when executed, cause the apparatus to alter the collection indicator based on a desired confidence interval associated with the transmission group of data points. In another embodiment, the computer program instructions are also configured to, when executed, cause the apparatus to determine a cumulative amount of data points collected by a plurality of vehicles traveling along the given road using a traffic volume of the given road over time. In still another embodiment, the computer program instructions are also configured to, when executed, cause the apparatus to repeatedly update the collection indicator.

In an example embodiment, the computer program instructions are configured to provide the collection indicator by providing different collection indicators on the given road for different types of data being collected. In another embodiment, the computer program instructions are also configured to, when executed, cause the apparatus to include all data points collected during the travel of the vehicle in the transmission group of data points. In still another example embodiment, the computer program instructions are also configured to, when executed, cause the apparatus to store at least one of the transmission group of data points or the non-transmission group of data points.

In yet another example embodiment, a computer program product is provided that includes at least one non-transitory computer-readable storage medium having computer-executable program code portions stored therein with the computer-executable program code portions including program code instructions configured to reduce redundant data uploads. The computer-executable program code portions include program code instructions configured to provide a collection indicator for a specific data type on a given road. The collection indicator provides an indication of an amount of data points to be transmitted for the specific data type on the given road with the amount of data points to be transmitted being less than an amount of data points for the specific data type that are collected on the given road. The computer-executable program code portions also include program code instructions configured to separate a plurality of data points for the specific data type collected during travel of a vehicle along the given road into a transmission group of data points and a non-transmission group of data points. Separating the plurality of data points includes determining an amount of data points to be included in the transmission group by applying the collection indicator to the plurality of data points for the specific data type that are collected during travel of the vehicle along the given road. The computer-executable program code portions further include program code instructions configured to cause the transmission of the transmission group of data points.

In an example embodiment, the computer code instructions are further configured to alter the collection indicator based on a desired confidence interval associated with the transmission group of data points. In another embodiment, the computer code instructions are further configured to determine a cumulative amount of data points collected by a plurality of vehicles traveling along the given road using a traffic volume of the given road over time. In still another embodiment, the computer code instructions are further configured to repeatedly update the collection indicator.

In an example embodiment, the computer code instructions are configured to provide the collection indicator by providing different collection indicators on the given road for different types of data being collected. In still another example embodiment, the computer code instructions are further configured to store at least one of the transmission group of data points or the non-transmission group of data points.

In an example embodiment, an apparatus is provided for reducing redundant data uploads. The apparatus includes means for providing a collection indicator for a specific data type on a given road. The collection indicator provides an indication of an amount of data points to be transmitted for the specific data type on the given road with the amount of data points to be transmitted being less than an amount of data points for the specific data type that are collected on the given road. The apparatus also includes means for separating a plurality of data points for the specific data type collected during travel of a vehicle along the given road into a transmission group of data points and a non-transmission group of data points. Separating the plurality of data points includes determining an amount of data points to be included in the transmission group by applying the collection indicator to the plurality of data points for the specific data type that are collected during travel of the vehicle along the given road. The apparatus further includes means for causing the transmission of the transmission group of data points.

In an example embodiment, the apparatus also includes means for altering the collection indicator based on a desired confidence interval associated with the transmission group of data points. In another embodiment, the apparatus also includes means for determining a cumulative amount of data points collected by a plurality of vehicles traveling along the given road using a traffic volume of the given road over time. In still another embodiment, the apparatus also includes means for repeatedly updating the collection indicator.

In an example embodiment, the means for providing the collection indicator include means for providing different collection indicators on the given road for different types of data being collected. In another embodiment, the apparatus also includes means for including all data points collected during the travel of the vehicle in the transmission group of data points. In still another embodiment, the apparatus also includes means for storing, with a memory device, at least one of the transmission group of data points or the non-transmission group of data points.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

An apparatus, method, and computer program product are provided in accordance with an example embodiment of the present disclosure to reduce redundant data collection by vehicles along a given road. The apparatus, method, and computer program product of an example embodiment considers the amount of data points typically collected along a given road and compares that amount to the amount of data points, such as a minimum amount of data points, needed to make effective use of the data. In this regard, data aggregation often needs a statistically relevant amount of data points in order to create reliable assumptions upon the data; however, when the amount of data points becomes excessive, the cost and time spent to collect the data does not result in improved results from the aggregation of the data. Instead the data points become redundant and strains the ability to gather data for other roads and/or data types. Therefore, in order to speed up the processing and transmission of data points, the amount of data collected along busy roads may be throttled such that only some, but not all of the data is processed and transmitted, thereby consuming fewer processing and transmitting resources but providing for aggregation of the data with similar reliability.

As such, in an example embodiment of the present disclosure, a collection indicator associated with a specific type of data to be collected along a given road is provided and used to determine how much of the data, such as probe points, that is initially recorded by an apparatus will be transmitted and processed. Based on the collection indicator, which may be altered in order to ensure a certain confidence level, all of the vehicles on the road will, on average, send the appropriate amount of data to allow for results from the aggregation of the data without transmitting and processing redundant data. For example, on busy roads, devices carried by vehicles send fewer data points, while continuing to send all of their recorded data points on less busy roads. The vehicle may store some or all of the data points locally regardless of whether the data points they were transmitted. The overall reduction in the amount of transmitted data points results in a reduction in consumption of the network resources and therefore conserves the communication infrastructure. Additionally, processing resources may be similarly conserved by now processing fewer data points even though the results of the data aggregation remain of comparable reliability. Additionally, in some embodiments, the collection indicators are static and stored in a map database, either remote from but in communication with the apparatus or included within the apparatus, which further reduces the consumption of processing and transmitting network resources otherwise utilized to repeatedly calculate and transmit the collection indicators.

Figure 1:
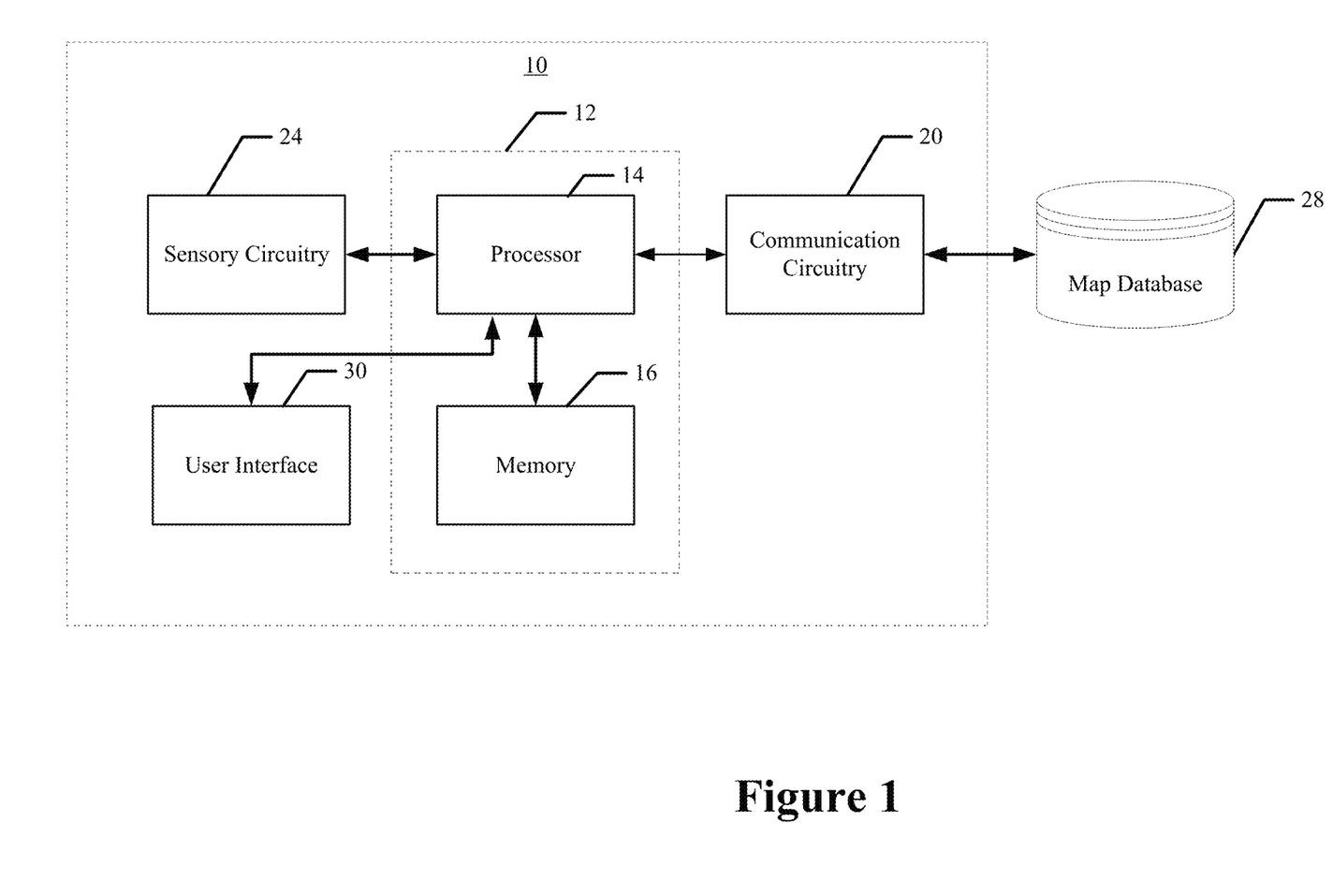
FIG. 1 is a block diagram of an apparatus that may be specifically configured in accordance with an example embodiment of the present disclosure.

Referring now to FIG. 1, a block diagram of an apparatus 10 according to an example embodiment of the present disclosure is provided. In various embodiments, the apparatus may be embodied by a server and/or cloud system, such as a computer services platform, e.g. a mapping or navigation services platform, that receives, stores and/or analyses a variety of data, such a map data, traffic data, weather data, data regarding the autonomous vehicles and/or data provided by other devices, such as devices carried by motorized vehicles, pedestrians and/or bicyclists. The data may be analyzed so as to perform various services including, for example, defining routes for autonomous vehicles and/or routes for pedestrians or bicyclists and/or for providing navigation services, such as the control of the one or more autonomous vehicles. Alternatively, the apparatus may be embodied by a computing device carried by a vehicle. For example, the computing device may be embodied by a mapping system, navigation system, positioning system, e.g., a global position system (GPS), an Advanced Driver Assistance System (ADAS) or the like, that captures probe data indicative of the location of the vehicles at different points in time. Alternatively, the computing device may be carried by the driver or other occupant of the vehicle. In this regard, the computing device may be user equipment, such as in the form of a mobile device, such as a personal digital assistant (PDA), mobile telephone, smart phone, personal navigation device, wearable device, smart watch, tablet computer or the like.

Regardless of the manner in which the apparatus 10 is embodied, the apparatus of an example embodiment may include, be associated with, or otherwise be in communication with a processing circuitry 12, including a processor 14 and a memory device 16, communication circuitry/interface 20, and optionally a user interface 30. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may include a communication interface 20 that may be any means such as a device or circuitry embodied in either hardware or a combination of hardware and software that is configured to receive and/or transmit data from/to other electronic devices in communication with the apparatus, such as via near field communication (NFC) or other proximity-based communication techniques. Additionally or alternatively, the communication circuitry/interface may be configured to communicate over any of various wireless communication protocols including Global System for Mobile Communications (GSM), such as but not limited to Long Term Evolution (LTE). In this regard, the communication circuitry/interface may include, for example, an antenna (or multiple antennas) and supporting hardware and/or software for enabling communications with a wireless communication network. Additionally or alternatively, the communication circuitry/interface may include the circuitry for interacting with the antenna(s) to cause transmission of signals via the antenna(s) or to handle receipt of signals received via the antenna(s).

The apparatus 10 of an example embodiment may also optionally include or otherwise be in communication with a user interface 30. The user interface may include a touch screen display, a speaker, physical buttons, and/or other input/output mechanisms. In an example embodiment, the processor circuitry 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 16, and/or the like).

In some embodiments, the user interface 30 may be in communication with the processor 14 to receive an indication of a user input and/or to cause presentation of the video output generated by execution of computer software. As such, the user interface may include, for example, a keyboard, a mouse, a joystick, a display, a touch screen(s), touch areas, soft keys, a microphone, a speaker, or other input/output mechanisms. Alternatively or additionally, the processor 14 may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device 16, and/or the like). The user interface may include one or more user equipment.

The apparatus 10 may be equipped, or otherwise in communication with sensory circuitry 24, which may include one or more sensors, such as a global positioning system (GPS), accelerometer, image sensor/camera, LiDAR (Light Distancing and Ranging) sensor, radar, and/or gyroscope. Any of the sensors may be used to sense information regarding the movement, positioning, or conditions of the vehicle and/or surroundings. For example, a sensor, or set of sensors, may be used to measure the road friction and/or the road surface temperature. In some example embodiments, such sensors may be implemented in a vehicle or other remote apparatus, and the information detected may be transmitted to the apparatus 10, such as by near field communication (NFC) including, but not limited to, Bluetooth™ communication, or the like. In some embodiments, the sensory circuitry may be connected, at least in part, by a wired connection.

In an example embodiment, the apparatus 10 includes, is associated with or is otherwise in communication with a map database 28. The map database represents road segments in a geographic area. In this regard, the map database contains map data that indicates attributes of the road segments. The map database may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths, sidewalks or other types of pedestrian segments as well as open areas or parks in addition to the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 28 of an example embodiment also includes information relating to one or more collection indicators, as described below, for one or more data types along one or more segments of a road. In this regard, the map database may include at least one collection indicator (or information, such as the vehicle frequency, from which the collection indicator may be derived) for each of a plurality of road segments. And, in instances in which different data types have different collection indicators, the map database may include multiple collection indicators for each of a plurality of different road segments, each collection indicator for a road segment associated with a different data type. Although described herein in conjunction with the storage of collection indicators by the map database, the collection indicators may be provided in other manners, such as by being stored by the memory device 16.

The map database 28 may be a master map database, such as a high definition (HD) map database, stored in a format that facilitates updates, maintenance, and development. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation. In this regard, the map database 28 includes map data and other information from which the routes of autonomous vehicles and of a pedestrian or bicyclist may be defined. Once defined, the routes of autonomous vehicles and of a pedestrian or bicyclist may be stored, such as by the map database.

As mentioned above, the map database 28 may be a master geographic database, but in alternate or complementary embodiments, a client side map database may represent a compiled navigation database that may be used in or with end user devices to provide navigation and/or map-related functions. In such a case, the map database can be downloaded or stored on the end user device which can access the map database through a wireless or wired connection, such as a communications network.

In some embodiments, a vehicle may be connected, either directly or remotely, with an apparatus 10 according to an example embodiment of the present invention. In some embodiments, the apparatus may be carried by the vehicle (e.g., an in-vehicle navigation system or mobile device). Alternatively or additionally, some or all of the apparatus may be remote from the vehicle (e.g., the sensors may be on the vehicle, while the processing circuitry 12 is remote). The vehicle may be connected to the apparatus through a network 330, such as the one shown in FIG. 4. In some embodiments, the network may be a wired connection, a wireless connection, or a combination thereof. The wireless connection could be Bluetooth, Wi-Fi, LTE, or the like.

In operation, the processing circuitry 12 may receive probe data from a probe data source (such as a sensor circuitry 24). The probe data source may include one or more detectors or sensors that function as a positioning system built into or carried by a vehicle, such as a mapping or navigation system or a mobile device carried by an occupant of a vehicle. In this regard, a mobile device may include a system for tracking mobile device movement, such as rotation, velocity, or acceleration. Alternatively, the probe data source of this example embodiment may use communications signals for position determination. The probe data source may receive location data from a positioning system, such as a global positioning system (GPS), cellular tower location methods, access point communication fingerprinting, or the like.

Probe data (e.g., collected by a probe data source) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to an example embodiment in which the probe data is associated with motorized vehicles traveling along roadways, the probe data may include, without limitation, location data, (e.g., positional coordinates such as a latitudinal, longitudinal position, and/or height, GPS coordinates, proximity readings associated with a radio frequency identification (RFID) tag, or the like), rate of travel, (e.g., speed), direction of travel, (e.g., heading, cardinal direction, or the like), device identifier, (e.g., vehicle identifier, user identifier, or the like), a time stamp associated with the data collection, or the like. The probe data source may be any device including but not limited to those described above capable of collecting the aforementioned probe data.

Figure 2:
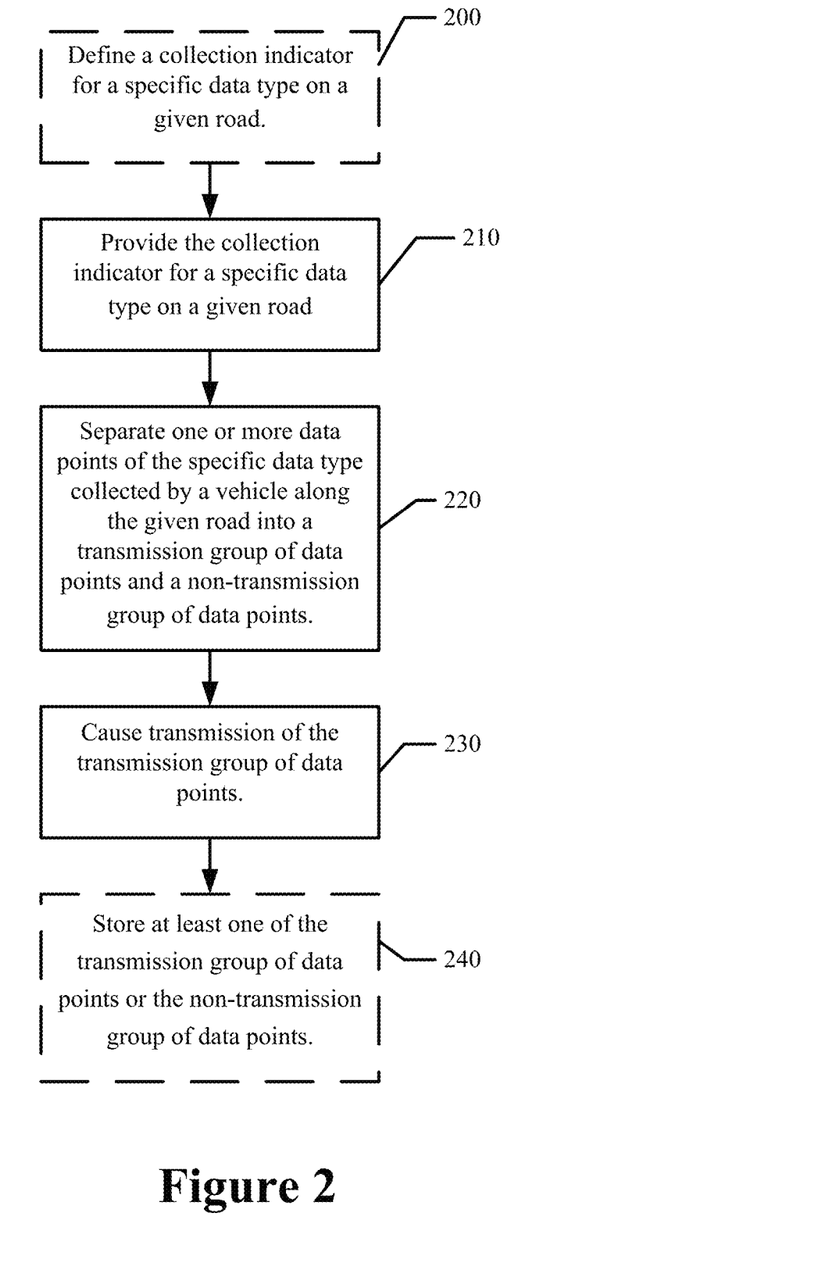
FIG. 2 is a flowchart of the operations performed, such as by the apparatus of FIG. 1, in accordance with an example embodiment of the present disclosure.

Referring now to FIG. 2, the operations performed by the apparatus 10 of an example embodiment are depicted. As shown in optional Block 200 of FIG. 2, the apparatus of an example embodiment includes means, such as the processing circuitry 12, the processor 14 or the like, for defining a collection indicator for a specific data type on a given road using at least one of the target amount of data points to be transmitted, the amount of data points collected by the vehicle of interest during transit along a road segment and/or collected by a plurality of vehicles that travel along the same road segment, and the desired confidence level. In some embodiments, the collection indicator may be determined by the apparatus, such as the processor 14, or the collection indicator may be defined by a network element, such as a mapping or navigation services platform and provided to the apparatus. In order to define the collection indicator, a measure of the cumulative amount of probe points collected along a respective road segment during a particular period of time is determined. The total probe points may be determined based upon historical probe points that have been received and stored or probe points that are received and counted in real time. Alternatively, the total probe points may be determined based on the number of vehicles that travel along the respective road segment during the particular period of time. In this regard, the total number of vehicles may be reduced based upon the percentage of vehicles anticipated to collect probe data, such as based upon a predefined percentage based, for example, upon historical information. The total number of vehicles that are anticipated to collect probe data is then multiplied by the number of probe points each vehicle is anticipated to collect while traveling along the road segment, such as based upon a predefined frequency with which probe points are collected. As such, cumulative amount of probe points may be determined. In various embodiments, the frequency in which data points are collected by a vehicle may depend on the type of data being collected. For example, measurements of road friction may be taken once every 15 minutes with measurements of other types of data points being collected more or less frequently. This information relating to the cumulative amount of data points may be stored by the apparatus, such as in the memory device 16 or by a network element in communication with the apparatus.

The cumulative amount of probe points, also referenced as data points and collectively as probe data, may exceed the amount required to understand the road segment and the traffic flow along the road segment and, as such, may include redundant information. As such, the collection indicator is defined to specify the amount or proportion of the data points that are collected that are then transmitted, such as to the network element, such as a mapping or navigation services platform, for analysis. In this regard, the number of data points required for a road segment during a particular period of time to maintain the accuracy of real time information relating to the road segment and the traffic flow therealong may be predefined such that the collection indicator is defined to be the ratio of the number of data points that are required to the cumulative amount of data points.

The definition of the collection indicator may be at least partially dependent upon a desired confidence interval for the information relating to the road segment and the traffic flow therealong. The desired confidence interval may be predefined. In this regard, the collection indicator may vary directly and, in one embodiment, proportionately to the desired confidence level. In this example embodiment, the collection indicator is larger (resulting in the transmission of a greater percentage of the data points that are collected) when the desired confidence level is greater. Conversely, the collection indicator of this example embodiment is smaller (resulting in the transmission of a smaller percentage of the data points that are collected) when the desired confidence level is smaller. In some embodiments, a cushion may be provided in the collection indicator to ensure that a sufficient number of data points are collected. For example, the collection indicator defined as described above based on the ratio of the number of data points that are required to the cumulative amount of data points may be modified, such as increased by the cushion. Thus, additional data points may be transmitted to insure that a sufficient number of data points are transmitted. For example, the probability of not transmitting a data point may be cushioned by 20% and, as a result, may be 40% instead of 20% to ensure that enough data points are transmitted. The cushion may be predefined. The cushion may be associated with a specific confidence level or may be unrelated to the confidence level. In an example embodiment, a larger cushion may be chosen to reduce the statistical risk of gaps in the data, though increasing the cushion may correspondingly increase the cost (e.g., processing costs).

In an example embodiment of defining the confidence indicator, the arrival of cars during a particular period of time along a road segment may be modeled using a Poisson process. In one such case, the probability that no vehicle provider probe data regarding the road for more than x seconds is $1-e^{-\lambda x}$, where $\lambda$ is the frequency with which vehicles travel along the road. For example, if the system is to be designed such that it is 95% sure that the time between two probe data measurements is no longer that x seconds, then probe data must be captured at a frequency $\lambda \geq \log 20/x$. Thus, depending upon the number of vehicles that travel along the road during a particular period of time, the collection indicator can be defined so as to capture and transmit data points at the desired frequency $\lambda$.

The data points that are collected may include a variety of different types of data regarding the vehicle, the road, and/or the environment. In some embodiments, a single collection indicator may be defined that applies uniformly to all different data types. In other embodiments, however, different collection indicators may be defined for different data types, even though the data points are collected by the same vehicle traveling on the same road during the same time period. For example, a first collection indicator may be defined for information indicating the location of the vehicle at a certain time, while a second collection indicator may be defined for information regarding road friction. The different collection indicators may be defined, for example, based on the number of data points that are required to maintain a desired level of confidence, which may vary between data types. As a result of the use of different collection indicators for different data types in some embodiments, different portions of the data points that are collected may be transmitted in different proportions.

Figure 4:
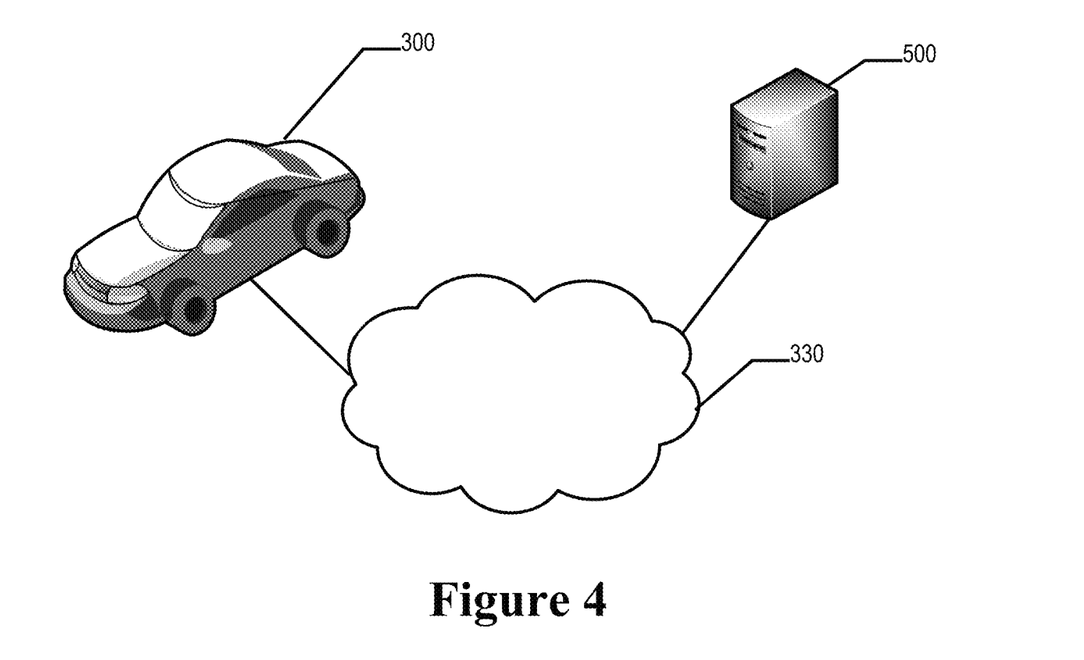
FIG. 4 is an illustration of a system using one or more example embodiments of the present disclosure.

In some embodiments, the collection indicator may be determined independent of the apparatus (e.g., the collection indicator may be determined by a third party or may be predefined). The collection indicator may be dedicated to a specific road and/or data type. In some embodiments, one or more collection indicators may be stored in the apparatus, such as by the memory device 16. Additionally or alternatively, one or more collection indicators may be provided from to the apparatus, such as through a network from a network element such as a mapping or navigation services platform. The network may be wired, wireless, or a combination thereof. The network may be the same or distinct from the network 330 connecting the apparatus 10 and one or more data aggregators 500, as shown in FIG. 4 and discussed below.

As shown in Block 210 of FIG. 2, the apparatus 10 of an example embodiment includes means, such as the processing circuitry 12, the processor 14 or the like, for providing the collection indicator for a specific data type on a given road. As discussed above in relation to the definition of the collection indicator, the collection indicator may be provided by the apparatus itself. In some embodiments, one or more collection indicators may be stored by the apparatus, such as by the memory device 16 or in a map database 28, such as in association with the given road. In other embodiments, one or more collection indicators may be provided to the apparatus through a network 330. In some embodiments, the apparatus, such as the processor, may notify the supplier of the collection indicator (e.g., the map database 28) with the location and/or the type of data to be transmitted (e.g., the apparatus, such as the processor, may indicate that the data point is for a data type of "road friction" for Main Street, which may allow the map database to determine if a corresponding collection indicator is available for road friction data on Main Street). In some embodiments, the apparatus may be configured only to collect and transmit one type of data and, as such, road type need not be specific (e.g., an apparatus may only be connected to the portion of the map database related to road friction).

As shown in Block 220 of FIG. 2, the apparatus 10 of an example embodiment includes means, such as the processing circuitry 12, the processor 14 or the like, for separating one or more data points of the specific data type collected by a vehicle along the given road into a transmission group of data points and a non-transmission group of data points. The transmission group is all of the data points that are to be transmitted by the apparatus. In some embodiments, the data may be transmitted individually (e.g., as soon as the data is placed in the transmission group, it is transmitted). Alternatively, the data may be transmitted in a batch with other data points (e.g., the apparatus may allow a plurality of data points to accumulate before transmission). The non-transmission group is all of the collected data points that will not be transmitted. These data points may be immediately discarded individually (e.g., as soon the data is placed in the non-transmission group). In some embodiments, the data of the non-transmission group may accumulate before either being discarded or stored, as discussed below. In this regard, the data in the non-transmission group may be stored in some embodiments for further use by the apparatus or otherwise (e.g., the data may later be manually transferred by a user).

In some embodiments, the determination of how many data points are placed into the transmission group may be dependent upon the collection indicator, either directly or indirectly. The apparatus of an example embodiment may capture the same number of data points along a path, regardless of the collection indicator. In some embodiments, the apparatus, such as the processor, may then use the collection indicator, such as by multiplying the collection indicator by the number of data points that are collected to determine the number of collected data points to place in the transmission group and to then transmit. For example, if a vehicle, equipped with an example embodiment of the present disclosure, captures 10 data points along a road and the collection indicator is 0.5, then 50% of the data points are placed in the transmission group, while the other 50% of the data points are placed in a non-transmission group. The collection indicator may be used by the apparatus, such as the processor, to determine the percentage of data points placed in the transmission and non-transmission group. Thus, the collection indicator may be used by the apparatus, such as the processor, to determine the number of data points to transmit over a given amount of time (e.g., if the collection indicator is 0.3, then 3 out of every 10 data points that are collected will be transmitted). In embodiments in which less than all of the data points are transmitted, the data points that are included in the transmission group may be spaced apart, such as evenly space apart, throughout all of the data points. For example, in an embodiment in which the collection indicator is 0.25, every fourth data point may be included in the transmission group with three intervening data points included in the non-transmission group.

As shown in Block 230 of FIG. 2, the apparatus 10 of an example embodiment includes means, such as the processing circuitry 12, the processor 14 or the like, for causing transmission of the transmission group of data points. As stated above, data points in the transmission group may be transmitted individually, or may be transmitted in batches of more than one data point. In an example embodiment of the present disclosure, the apparatus, along with other data collection devices, are connected to or in communication with a network 330. As discussed in more detail below in reference to FIG. 4, the network may then be connected to a data aggregator 500. The data aggregator may collect data for various uses and from various sources. However, in order to conserve network processing and storage resources, a data aggregator may want to limit the amount of redundant data collected (e.g., there may be no need for ten thousand data points about a specific street when the same information can be derived from 100 data points). Therefore, if the data that is provided to these data aggregators has already been screened by the apparatus without substantially biasing the results, then data aggregators can spend less money on or the same resources for transmission and processing of other data types and/or locations.

As shown in optional Block 240 of FIG. 2, the apparatus 10 of an example embodiment includes means, such as the processing circuitry 12, the processor 14, the memory device 16 or the like, for storing at least one of the transmission group of data points or the non-transmission group of data points. In some embodiments, all data points, whether transmitted or not, may be stored, such as by the memory device 16. The storage may be either short term (e.g., until the apparatus is notified that the data points are not needed) or long term (e.g., collected data may be later uploaded automatically or manually to a data aggregator, such as during an off-peak time period.

Figure 3:
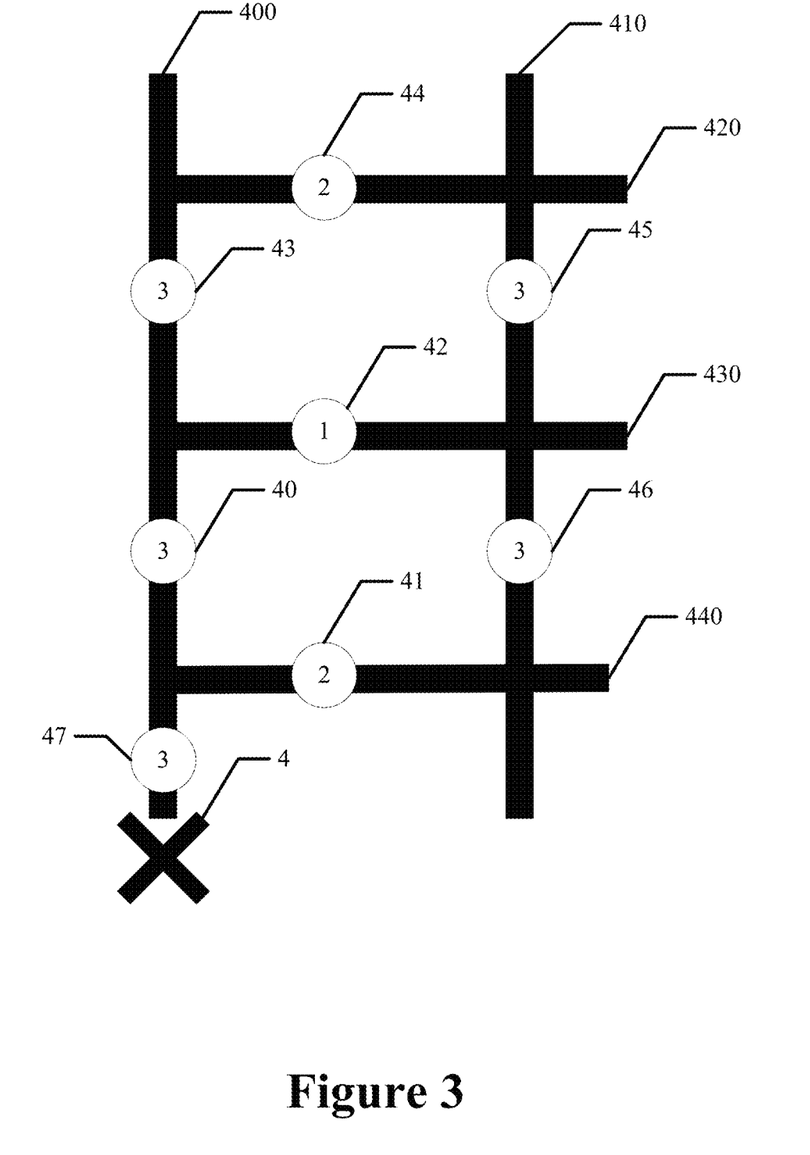
FIG. 3 is a map illustrating an example area of roads with information from which a collection indicator may be created according to an example embodiment of the present disclosure.

Referring now to FIG. 3, a map is provided that illustrates the varying amount of traffic along a given route. The circles on the map (e.g., circles 40, 41, and 42) are examples of vehicle frequency levels on a given segment of road. In this example, there are three different frequency levels with Level 1 indicating a low frequency (e.g., circle 42), Level 2 indicating a medium frequency (e.g., circles 41 and 44), or Level 3 indicating a high frequency (e.g., circles 40, 42, 43, 45, and 46). In some examples, there may be no discrete levels and instead information regarding the amount of traffic, such as in terms of the number vehicles per time may be provided for each road segment. Additionally, there may be more or less frequency levels based on the desired confidence level (e.g., more levels will allow adherence to more narrowly tailored data confidence levels). The information shown may be used, either alone or in combination with other factors, to create the collection indicator for a given road. In an example, with a vehicle equipped with an example embodiment of the present disclosure, Level 3 roads may have lower collection indicators than Level 1 or Level 2 roads. The vehicle frequency may be combined with the desired amount of vehicles, the desired confidence level, and the like in order to create the collection indicator as described above.

In an example referencing FIG. 3, a vehicle 4 carrying a device, equipped with an example embodiment of the present disclosure, is traveling on road 400 where the vehicle frequency 47 is a level 3. In such cases, the apparatus, such as the processor, may interact with the map database 28 to determine the appropriate collection indicator for the given road. In this example, when the vehicle frequency is high, the apparatus 10, such as the processor, may transmit less data than is collected. In the present example, traffic level 3 may be defined as more than 200% of the desired amount of data points as a result of the high frequency of vehicle traffic. In such a case with a collection indicator of 50%, the apparatus may direct the communication circuitry/interface to only transmit half of the data points collected (e.g., each data point would have a 50% chance of being transmitted). The number of vehicles carrying devices configured with an example embodiment of the present disclosure may also affect the collection indicator For example, vehicles traveling over the road that fail to carry a device in accordance with an example embodiment may transmit all data points. Thus, vehicles carrying devices with an example embodiment of the present disclosure may need to send even less data points in order to have transmitted a sufficient amount).

Continuing with the example of FIG. 3, once the vehicle turns off of road 400 and onto road 440, the vehicle frequency 41 is Level 2, indicating a medium frequency. In this example, Level 2 may be designated for when the amount of vehicles on the road is anticipated to collect between 100% and 200% of the target amount of data points. In such a case, the apparatus, such as the processor 14, may instruct the communication circuitry/interface to transmit less than all of the data points, but more data points than transmitted for level 3 roads. In an example in which the vehicle turned onto road 430, the vehicle frequency is a Level 3, indicating a low frequency. In the present example, the low vehicle frequency corresponds to the vehicles on the road collecting less than the target amount of data points. In such cases, the collection indicator may instruct the apparatus to transmit all data points that are collected (e.g., the collection indicator may be 1). In this example, the vehicle frequency is determined for road segments extending between adjacent intersections. In an example embodiment, the vehicle frequency may be similar across adjacent segments (e.g., multiple consecutive segments 45, 46 of the road segment 410 may have the same frequency level). As shown in FIG. 3, there may be multiple segments of road close to each other that have different amounts of traffic (e.g., road 420 has a higher frequency level 44 than the frequency level 42 of the adjacent parallel road segment 430). In other embodiments, the vehicle frequency may be determined over a different length of road segments (e.g., the segments may be based on a distance and not intersections).

As described above, the collection indicator may be a number indicating the percentage of data points collected that are transmitted (e.g., a collection indicator of 0.3 would result in 30% of the data points that are collected on a road being transmitted). In some embodiments, the collection indicator may be a number indicating the converse, that is, the percentage of data points that are not transmitted (e.g., a collection indicator of 0.3 in this example embodiment would result in 70% of the data points on a road being transmitted). Additionally or alternatively, the collection indicator may be another numerical or non-numerical indicator which may be used by an apparatus according to an example embodiment of the present disclosure in order to define the amount of collected data points that are transmitted.

In some embodiments, in which a map database 28 does not have information relating to the vehicle frequency or otherwise defining the collection indicator, the apparatus, such as the processor, may default to sending all data points that are collected. Additionally or alternatively, the apparatus, such as the processor, may use information relating to the collection indicator for similar and/or nearby roads to determine how many data points to transmit. In some embodiments, the collection indicator may be directly related to the vehicle frequency (e.g., a certain frequency results in a specific collection indicator) or indirectly related to the vehicle frequency (e.g., the collection indicator may use the vehicle frequency in combination with other factors including target amount of data points, the number of vehicles equipped with the apparatus, and the like).

Referring now to FIG. 4, a vehicle 300 equipped with an example embodiment of the present disclosure is shown as a part of an example system. While only one vehicle is shown, multiple vehicles configured in accordance with an example embodiment, as well as other vehicles that simply transmit all data points that are collected, may transmit data to the data aggregator 500. The vehicle may be connected to a data aggregator through a network 330. In some embodiments, the network may be a wireless connection, such as provided by Bluetooth, Wi-Fi, LTE, or the like. The data aggregator may be any computing device or service that receives the data transmitted by an apparatus and, in turn, performs a service such as aggregating and/or storing the data points. For example, the data aggregator may be a mapping or navigation services platform in some embodiments. The data aggregator may be dedicated to a specific type of data (e.g., a data aggregation providing only a road friction service may only collect measurements of the road friction). Additionally or alternatively, the data aggregator may be configured to receive a plurality of different data types. As such, the data aggregators may vary in capacity (e.g., some data aggregators may provide more or different services than others). In some embodiments, the data aggregator may only collect data for a certain roads, while in other embodiments the data aggregator may collect data points for all roads. In various embodiments, the data aggregator may store the data collected before the data points are analyzed, either by the same data aggregator or another data aggregator (e.g., some data aggregators may only function as storage for other data aggregators).

FIG. 2 illustrates a flowchart of an apparatus, method, and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for reducing redundant data uploads, the method comprising:
   receiving a collection indicator for a specific data type along a path of a roadway,
   wherein the collection indicator provides an indication of an amount of data points to be transmitted for the specific data type along the path of the roadway with the amount of data points to be transmitted being less than an amount of data points for the specific data type that are collected along the path of the roadway,
   wherein the data points collected along the path of the roadway are collected at a plurality of locations along the path of the roadway;
   separating a plurality of data points for the specific data type collected during travel of a vehicle along the path of the roadway into a transmission group of data points and a non-transmission group of data points,
   wherein separating the plurality of data points comprises determining an amount of data points to be included in the transmission group by applying the collection indicator to the plurality of data points for the specific data type that are collected during travel of the vehicle along the path of the roadway; and
   causing the transmission of the transmission group of data points.

2. The method according to claim 1 further comprising altering the collection indicator based on a desired confidence interval associated with the transmission group of data points.

3. The method according to claim 1 further comprising determining a cumulative amount of data points collected by a plurality of vehicles traveling along the path of the roadway using a traffic volume of the path of the roadway over time.

4. The method according to claim 1 further comprising repeatedly updating the collection indicator.

5. The method according to claim 1, wherein providing the collection indicator comprising providing different collection indicators along the path of the roadway for different types of data being collected.

6. The method according to claim 1 further comprising including all data points collected during the travel of the vehicle in the transmission group of data points.

7. The method according to claim 1 further comprising storing, with a memory device, at least one of the transmission group of data points or the non-transmission group of data points.

8. An apparatus for reducing redundant data uploads, the apparatus comprising at least one processor and at least one non-transitory memory including computer program code instructions, the computer program code instructions configured to, when executed, cause the apparatus to:
   receive a collection indicator for a specific data type along a path of a roadway,
   wherein the collection indicator provides an indication of an amount of data points to be transmitted for the specific data type along the path of the roadway with the amount of data points to be transmitted being less than an amount of data points for the specific data type that are collected along the path of the roadway,
   wherein the data points collected along the path of the roadway are collected at a plurality of locations along the path of the roadway;
   separate a plurality of data points for the specific data type collected during travel of a vehicle along the path of the roadway into a transmission group of data points and a non-transmission group of data points,
   wherein separating the plurality of data points comprises determining an amount of data points to be included in the transmission group by applying the collection indicator to the plurality of data points for the specific data type that are collected during travel of the vehicle along the path of the roadway; and
   cause the transmission of the transmission group of data points.

9. The apparatus according to claim 8, wherein the at least one memory and computer program code are configured to, with the processor, cause the apparatus to alter the collection indicator based on a desired confidence interval associated with the transmission group of data points.

10. The apparatus according to claim 8, wherein the at least one memory and computer program code are configured to, with the processor, cause the apparatus to determine a cumulative amount of data points collected by a plurality of vehicles traveling along the path of the roadway using a traffic volume of the path of the roadway over time.

11. The apparatus according to claim 8, wherein the at least one memory and computer program code are configured to, with the processor, cause the apparatus to repeatedly update the collection indicator.

12. The apparatus according to claim 8, wherein providing the collection indicator comprising providing different collection indicators along the path of the roadway for different types of data being collected.

13. The apparatus according to claim 8, wherein the at least one memory and computer program code are configured to, with the processor, cause the apparatus to include all data points collected during the travel of the vehicle in the transmission group of data points.

14. The apparatus according to claim 8, wherein the at least one memory and computer program code are configured to, with the processor, cause the apparatus to store at least one of the transmission group of data points or the non-transmission group of data points.

15. A computer program product comprising at least one non-transitory computer-readable storage medium having computer-executable program code portions stored therein, the computer-executable program code portions comprising program code instructions configured to:
   receive a collection indicator for a specific data type along a path of a roadway,
   wherein the collection indicator provides an indication of an amount of data points to be transmitted for the specific data type along the path of the roadway with the amount of data points to be transmitted being less than an amount of data points for the specific data type that are collected along the path of the roadway,
   wherein the data points collected along the path of the roadway are collected at a plurality of locations along the path of the roadway;
   separate a plurality of data points for the specific data type collected during travel of a vehicle along the path of the roadway into a transmission group of data points and a non-transmission group of data points,
   wherein separating the plurality of data points comprises determining an amount of data points to be included in the transmission group by applying the collection indicator to the plurality of data points for the specific data type that are collected during travel of the vehicle along the path of the roadway; and
   cause the transmission of the transmission group of data points.

16. The computer program product according to claim 15 further comprising program code instructions to alter the collection indicator based on a desired confidence interval associated with the transmission group of data points.

17. The computer program product according to claim 15 further comprising program code instructions to determine a cumulative amount of data points collected by a plurality of vehicles traveling along the path of the roadway using a traffic volume of the path of the roadway over time.

18. The computer program product according to claim 15 further comprising program code instructions to repeatedly update the collection indicator.

19. The computer program product according to claim 15, wherein providing the collection indicator comprising providing different collection indicators on the path of the roadway for different types of data being collected.

20. The computer program product according to claim 15 further comprising program code instructions to store at least one of the transmission group of data points or the non-transmission group of data points.

* * * * *